United States Patent
Baier et al.

(10) Patent No.: US 8,904,764 B2
(45) Date of Patent: Dec. 9, 2014

(54) METHOD FOR FEEDING THERMAL ENERGY INTO AN EXHAUST EMISSION CONTROL UNIT CONNECTED IN THE EXHAUST GAS SYSTEM OF AN INTERNAL COMBUSTION ENGINE

(75) Inventors: Bettina Baier, Menden (DE); Bernd Maurer, Menden (DE); Klaus Schrewe, Menden (DE); Frank Noack, Menden (DE)

(73) Assignee: HJS Emission Technology GmbH & Co. KG, Menden (DE)

( * ) Notice: Subject to any disclaimer, the term of this patent is extended or adjusted under 35 U.S.C. 154(b) by 0 days.

(21) Appl. No.: 14/005,615

(22) PCT Filed: Mar. 26, 2012

(86) PCT No.: PCT/EP2012/055296
§ 371 (c)(1),
(2), (4) Date: Sep. 17, 2013

(87) PCT Pub. No.: WO2012/130789
PCT Pub. Date: Oct. 4, 2012

(65) Prior Publication Data
US 2014/0000241 A1    Jan. 2, 2014

(30) Foreign Application Priority Data
Mar. 28, 2011  (DE) .................. 10 2011 001 596

(51) Int. Cl.
*F01N 3/18* (2006.01)
*F01N 3/10* (2006.01)
*F01N 3/025* (2006.01)
*F01N 3/035* (2006.01)
*F01N 9/00* (2006.01)
*F01N 13/00* (2010.01)

(52) U.S. Cl.
CPC ............... *F01N 3/10* (2013.01); *F01N 3/0253* (2013.01); *F01N 3/035* (2013.01); *F01N 3/106* (2013.01); *F01N 9/002* (2013.01); *F01N 13/0093* (2014.06); *F01N 2240/36* (2013.01); *F01N 2250/02* (2013.01); *F01N 2410/00* (2013.01); *F01N 2430/00* (2013.01); *F01N 2560/025* (2013.01); *F01N 2560/06* (2013.01); *F01N 2610/03* (2013.01); *F01N 2900/0411* (2013.01); *F01N 2900/1404* (2013.01); *Y02T 10/47* (2013.01)
USPC ............................................ 60/288

(58) Field of Classification Search
CPC .. F01N 13/0093; F01N 2410/00; F01N 3/106
USPC ................. 60/286–288, 295, 297, 300, 303
See application file for complete search history.

(56) References Cited

FOREIGN PATENT DOCUMENTS

DE    102006033929 A1 *  1/2008    ............... F01N 3/20
DE    202009005251 U1    12/2009
EP    2305978 A1    4/2001

OTHER PUBLICATIONS

Machine translation of DE102006033929A1.*
Machine translation of DE202009005251U1.*
International Search Report for International Application No. PCT/EP2012/055296 mailed Jul. 16, 2012. (6 total pages).
Written Opinion of the International Searching Authority for International Application No. PCT/EP2012/055296 mailed Jul. 16, 2012. (10 total pages).

* cited by examiner

*Primary Examiner* — Kenneth Bomberg
*Assistant Examiner* — Jonathan Matthias
(74) *Attorney, Agent, or Firm* — Margaret Polson; Polson & Associates, PC

(57) ABSTRACT

The invention relates to a method for feeding thermal energy into an exhaust emission control unit (2) connected in the exhaust gas system of an internal combustion engine by heating the exhaust gas flowing to the exhaust emission control unit (2). Said exhaust gas is heated to a SET temperature. In said method, the exhaust gas discharged from the internal combustion engine is heated to the SET temperature by converting hydrocarbons (HCs) metered into the exhaust gas flow at two oxidation catalytic converters (7, 10) series-connected in the flow direction of the exhaust gas.

15 Claims, 4 Drawing Sheets

METHOD FOR FEEDING THERMAL ENERGY INTO AN EXHAUST EMISSION CONTROL UNIT CONNECTED IN THE EXHAUST GAS SYSTEM OF AN INTERNAL COMBUSTION ENGINE

CROSS REFERENCE APPLICATIONS

This application is a National Stage application of PCT/EP2012/055296 claiming priority from German application 10 2011 011 596.5 filed Mar. 28, 2011.

BACKGROUND

The invention relates to a method for feeding thermal energy into an exhaust emission control unit connected in the exhaust gas system of an internal combustion engine, in particular a diesel engine, by heating the exhaust gas flowing to the exhaust emission control unit to a SET temperature. The exhaust gas discharged from the internal combustion engine is heated to the SET temperature by converting hydrocarbons (HC) metered into the exhaust gas flow at two oxidation catalytic converters connected in series—in the direction of the flow of the exhaust gas. The first oxidation catalytic converter in the direction of the flow of the exhaust gas to the internal combustion engine is arranged in a secondary system, and the second oxidation catalytic converter which is downstream of the former converter is arranged in the exhaust gas system after the merging of the main and secondary systems.

Internal combustion engines, today diesel engines in particular, comprise control units that are connected in the exhaust gas system in order to reduce harmful or undesired emissions. Such a control unit can bean oxidation catalytic converter, a particle filter and/or an SCR stage, for example. A particle filter is used to collect soot particles discharged by the internal combustion engine. The soot that is entrained in the exhaust gas accumulates on the upstream side surface of the particle filter. A regeneration process of is triggered when the soot load of the particle filter reaches a sufficient level to prevent an excessive increase in the exhaust gas counter pressure during the course of the successive soot accumulation and/or to prevent the risk of clogging the filter. In this regeneration process, the soot that accumulates on the filter is burnt off (oxidized). The particle filter is regenerated after the completion of such a soot oxidation. Only a noncombustible ash residue remains. For a soot oxidation to occur, the soot must be at a certain temperature. As a rule, this temperature is approximately 600° C. If the oxidation temperature has been reduced by an additive or by providing $NO_2$, the temperature at which such a soot oxidation starts can be lower. If the soot is at a temperature below its oxidation temperature, then thermal energy has to be fed into the system, in order to be able to actively trigger a regeneration. An active regeneration can be started using engine-internal measures, by changing the combustion process so that the exhaust gas is discharged at a higher temperature. However, post-engine measures are, preferable in order to produce an active regeneration in numerous applications, particularly in the non-road field. In many cases, it is not possible in the context of exhaust emission control to have an influence on the engine-based measures.

From DE 20 2009 005 251 U1, an exhaust emission control unit is known, wherein the exhaust gas system is divided into a main exhaust gas system and a secondary exhaust gas system, for the purpose of actively producing the regeneration of a particle filter. A catalytic burner is connected in the secondary system, by which the partial exhaust gas flow flowing through the secondary system is heated and subsequently merged with the partial exhaust gas flow flowing through the main system. This results in the mixed exhaust gas mass flow being at a clearly higher temperature. The increase in the temperature of the exhaust gas flow is used to heat the soot accumulated on the upstream side of the particle filter to a temperature sufficient to trigger the regeneration process. An oxidation catalytic converter having an upstream hydrocarbon injection, which is arranged in the secondary system, is used as catalytic burner. An exhaust gas flap which can set the cross-sectional area that allows free flow in the main system can be used for controlling the exhaust gas mass flow flowing through the secondary system. An electro-thermal heating element is connected upstream of said converter for heating the oxidation catalytic converter connected in the secondary system to its light-off temperature, namely the temperature at which the desired exothermic HC conversion starts to occur on the catalytic surface. The latter heating element is operated when this oxidation catalytic converter has to be heated to its light-off temperature. This document also describes that the catalytic burner connected in the secondary system can be oversprayed in order to feed hydrocarbons to a second oxidation catalytic converter directly upstream of the particle filter in the flow direction. This allows these hydrocarbons to react with the same exothermic reaction on the catalytic surface of this second oxidation catalytic converter. In this manner, a two-step heating of the exhaust gas can be carried out in this previously known emission control installation. The exhaust gas flowing out of the second oxidation catalytic converter is then at the required temperature in order to heat the soot accumulated on the upstream side of the particle filter sufficiently so that the soot oxidizes.

Similarly, it can be desirable to increase the temperature of other exhaust emission control units, for example, of an oxidation catalytic converter or of an SCR stage, in order to bring the latter more rapidly to their operating temperature.

Based on this discussed prior art, the aim of the invention is to propose a method by means of which, in particular during the dynamic operation of an internal combustion engine, for example, of a diesel engine in a vehicle, in a short time, and at least largely uninfluenced by changing circumstances in the exhaust gas system, such as, for example, changing exhaust gas mass flows, a regeneration process can be triggered in a targeted manner in order to regenerate a particle filter.

SUMMARY

This aim is achieved according to the invention by a method for feeding thermal energy into an exhaust emission control unit connected in the exhaust gas system of an internal combustion engine. In this method, the exhaust gas flowing to the exhaust emission control unit is heated to a SET temperature, and the exhaust gas discharged from the internal combustion engine is heated to the SET temperature by converting hydrocarbons (HCs) metered into the exhaust gas flow at two oxidation catalytic converters series-connected in the direction of flow of the exhaust gas. The first oxidation catalytic converter from the internal combustion engine in the direction of flow of the exhaust gas is arranged in a secondary system, The second oxidation catalytic system (connected downstream of the former in the exhaust gas system) is arranged after the merging of the main and secondary systems.

First, as a function of the mass of the total exhaust gas flow discharged from the internal combustion engine, of the ACTUAL temperature and of the SET temperature of the exhaust gas flowing to the exhaust emission control unit, and by means of a pilot control variable which corresponds to or comes close to the current conditions, and which is taken from a pilot control diagram that takes into consideration the exhaust gas flow and the temperature rise to be achieved, the HC metering for feeding hydrocarbons to the secondary system upstream of the first oxidation catalytic converter and/or the exhaust gas mass flow flowing through the secondary system is/are to be set, second, the ACTUAL temperature of the exhaust gas flowing to the exhaust emission control unit is repeatedly determined, and finally, if a difference between the ACTUAL temperature and the SET temperature is noted, the setting of the HC metering and/or of the exhaust gas mass flow flowing through the secondary system is modified to reach the SET temperature, wherein the temperature monitoring steps are repeated as often as needed until the SET temperature is reached.

In this method, the current states within the exhaust gas system, including the exhaust gas mass flowing through said system, and the exhaust gas temperature upstream of the exhaust emission control unit, the particle filter for example, are taken into consideration. Here, it is assumed that the exhaust emission control unit is approximately at the temperature of the exhaust gas flow flowing to the exhaust emission control unit. In a first step, the exhaust gas mass flow discharged by the internal combustion engine is determined. In addition, the above-mentioned ACTUAL temperature is determined. These data are needed in order to control the feed of thermal energy, taking into consideration the SET temperature—that is to say the temperature at which the exhaust gas flowing to the exhaust emission control unit should be. In the case of a particle filter, the SET temperature would be the temperature that has to be present for the purposes of triggering a regeneration process of the filter. In order to bring the exhaust gas flow flowing to the exhaust emission control unit on the upstream side of said unit to the SET temperature in as short a time as possible, a first setting is carried out of the parameters—HC metering at the first oxidation catalytic converter as well as the exhaust gas mass flow led over said converter in the secondary system—which influences the heating process for heating the exhaust gas flow, using a pilot control variable which is taken from a pilot control diagram that has been stored to this effect. From the diagram of stored pilot control variables, the variable which corresponds to the current values (total exhaust gas mass flow and the temperature rise to be achieved) is selected, or, if no such pilot control variable has been stored, one that comes close to it is selected. If there is no pilot control variable present in the control diagram, then an interpolation is carried out between the available pilot control variables surrounding these pilot control variables. If the required pilot control variable is outside of the control diagram, then it is possible either to extrapolate or the most recent control parameter stored in the control diagram can be used. In the case of a control parameter obtained by interpolation or by extrapolation, the latter is used to set the operating parameters for the operation of the catalytic burner. The use of such a pilot control diagram allows a targeted setting of the parameters that determine the temperature rise, as a result of which not only the time taken to reach the SET value is reduced, but this process can also be carried out in a resource saving manner. Finally, the use of such a measure prevents excessive heating and thus excessive fuel consumption (HC consumption).

The ACTUAL temperature is determined repeatedly at the outlet side with respect to the second oxidation catalytic converter. This temperature is the temperature of the exhaust gas flow as it flows to the exhaust emission control unit. In this manner, the produced temperature rise can be controlled. If a difference is detected between the ACTUAL temperature and the SET temperature in the context of this observation, then the metering of the hydrocarbons and/or the exhaust gas mass flow flowing through the secondary system is changed accordingly. If the desired temperature rise has not yet been produced by the pilot control setting, and consequently the desired SET temperature has not yet been reached, it is possible to increase the HC metering in order to achieve more heating. On the other hand, the HC metering can be reduced if the ACTUAL temperature is clearly higher than the SET temperature.

By means of the repeated determination of the ACTUAL temperature downstream of the presetting, it is possible to do more than control the pilot control variables stored in the pilot control diagram. Indeed, by means of these measures, changes, in particular changes relating to the exhaust gas mass flow flowing through the exhaust gas system are immediately taken into consideration, the since the conditions used as the basis for the determination of the pilot control variables, for example by a dynamic operation of the internal combustion engine. This applies particularly to a dynamic operation of the internal combustion engine in the cold state, if, as a result of a change in the operating state, the exhaust gas mass flow increases and in this respect has a cooling effect. In such a case, the HC metering would be increased accordingly.

The steps of observing or determining the ACTUAL temperature, and the comparison of said temperature with the SET temperature, referred to as temperature monitoring in the context of this embodiment, are repeated as often as needed or carried out continuously, until the SET temperature has been reached. However, it is preferable to use a design in which the monitoring takes place over a certain time span checking that the SET temperature continues to be maintained. In a particle filter as exhaust emission control unit, the temperature monitoring is typically carried out for the entire duration of the regeneration process, ensuring that the regeneration process takes place as intended.

In this method, the two-step heating is advantageous, because it allows a varying design of the oxidation catalytic converters. Therefore, the oxidation catalytic converter arranged in the secondary system can be much smaller than the one located in the main system. Therefore, the catalytic burner arranged in the secondary system is used to heat the typically the larger burner, arranged in the main system, so that the latter is heated to its light-off temperature. It is also possible, in a preferred embodiment, that the oxidation catalytic converter of the secondary system has a higher noble metal load than the second oxidation catalytic converter connected downstream of the former converter. This entails cost advantages.

The downstream control of the temperature rise achieved by the pilot control setting is typically used for the case where the settings have been reset during the course of this process in order to store these new setting parameters as new pilot control variables or as pilot control variables replacing the pilot control variables originally present in the pilot control diagram. As a result of these system-caused changes this procedure is consequently self-learning, such that s changes caused by aging of the oxidation catalytic converters or the like, are automatically compensated for. At the same time, this provides the possibility of applying a considerably larger number of pilot control variables to a pilot control diagram, which at first has only a few pilot control variables, over the duration of operation of the internal combustion engine, or alternatively to correct pilot control variables contained in the control diagram.

In the case where an interface with the motor management is present or can be produced, the total exhaust gas mass flow discharged by the internal combustion engine can be determined or provided via the "load" and "rpm" functions. For example, the load can be determined from the suctioned air quantity. Alternatively or additionally to this, the total exhaust gas mass flow can also be determined in that the latter flow is heated with a defined energy quantity, and subsequently the temperature rise achieved with this energy quantity is determined. The energy quantity introduced into the exhaust gas mass flow is proportional to the temperature rise that can be achieved thereby. Consequently, the exhaust gas mass flow can be calculated in a simple manner, if the fed energy quantity and the temperature rise achieved thereby are known. It should be understood that, in such a calculation, correction parameters, such as, for example, the cooling over a certain flow section or the like, are taken into consideration in the determination of the temperature rise. Such a design is particularly suitable for retrofitting solutions or in the case of uses in which no interface with the motor management is present or can be produced.

In one embodiment, in order to be able to carry out the method at a time when the oxidation catalytic converter arranged in the secondary system has not yet reached its light-off temperature a thermoelectric heating element is arranged upstream of the oxidation catalytic converter. This heating element is used to preheat the exhaust gas flow flowing through the secondary system, which heats the oxidation catalytic converter downstream of the heating element. For the purpose of preheating the oxidation catalytic converter, the heating can be carried out at constant electrothermal heat output and variable exhaust gas mass flow, or also using at a variable heat output with a constant exhaust gas mass flow.

It should be understood that the above-described total mass flow determination via the evaluation of the temperature rise when a defined energy quantity is added can be carried out both using the oxidation catalytic converter and corresponding metering of hydrocarbons and also using such an electric heating element. For these purposes, it is preferable to use a thermoelectric heating element, since a total mass flow determination can be carried out, regardless of whether or not the oxidation catalytic converter is already at or above its light-off temperature. In addition, the added energy quantity in such a heating element can be determined more precisely, due to the fact that fewer factors have an influence on the heating of the exhaust gas flow than if the catalytic burners arranged in the secondary system is used for this purpose.

The exhaust gas mass flow led through the secondary system is set via a suitable control device. Here, it is possible to use, an exhaust gas flap arranged in the main system. It should be understood that one can also use, instead of an exhaust gas flap, settable throttles, valves or the like. Such a device can also be arranged in the secondary system or in the two systems.

This method is typically used if the exhaust gas flow has not yet reached the temperature required for an automatic particle filter regeneration, consequently in particular at cold exhaust gas temperatures, for example, at the temperatures of an exhaust gas after starting an engine, during idling, or in a low-load case.

According to a preferred embodiment of the method, the oxidation catalytic converter arranged in the secondary system has a lower light-off temperature than the second oxidation catalytic converter arranged in the main system. This has the advantage that the method can be used at lower temperatures, in particular without the need for the second oxidation catalytic converter, located upstream of the exhaust emission control unit to have a particularly high catalyst load relative to its size. Naturally, the above-mentioned second oxidation catalytic converter can already be the exhaust emission control unit to be brought to a SET temperature. This is associated with considerable cost advantages. In order to obtain a low light-off temperature of an oxidation catalytic converter, the latter must have a correspondingly high noble metal load. In this embodiment of the method, this condition applies only the oxidation catalytic converter arranged in the secondary system, which in turn is relatively small in terms of its construction size. The design of the first oxidation catalytic converter being relatively small in terms of its construction size additionally results in said converter being able to be heated more rapidly to its light-off temperature, since a smaller mass needs to be heated.

The HC metering for supplying the second oxidation catalytic converter preferably takes place by the HC metering with which hydrocarbons are supplied to the first oxidation catalytic converter. Here, the circumstance exploited is that only a certain HC quantity can be converted at the first oxidation catalytic converter. This means that, in the case of an excess metering, also called overspraying, unconverted hydrocarbons exit the first oxidation catalytic converter and can be fed as fuel to the second oxidation catalytic converter. Typically, such an overspraying occurs only if the second oxidation catalytic converter has reached its light-off temperature. This can be observed by means of a temperature sensor connected upstream of the second oxidation catalytic converter at a short separation. It is preferable to carry out the HC metering and the exhaust gas mass flow regulation for supplying the second oxidation catalytic converter with hydrocarbons in such a manner that hydrocarbons in the gas phase are fed to this second converter, in order to spontaneously trigger the desired reaction on the catalytic surface. This also promotes an equal distribution of the hydrocarbons fed to the second oxidation catalytic converter on its reactive surface.

A heating element upstream of the first oxidation catalytic converter is advantageously also used to allow the hydrocarbons metered in the secondary system to evaporate on said element, so that the first oxidation catalytic converter is also fed with hydrocarbons in the gas phase in this manner. As a result, not only is the reaction rate accelerated, but this also promotes an even distribution of hydrocarbons over the surface of the oxidation catalytic converter. In addition, in the case of such an open distribution of the supplied hydrocarbons, prior to their contact with the oxidation catalytic converter, heat losses are prevented, which otherwise have to be tolerated when liquid drops hit the catalytic surface. Therefore, the degree of efficiency of the oxidation catalytic converter is improved considerably thereby. It is advantageous for the HC metering to occur frontally on the heating element in such an embodiment. If the first oxidation catalytic converter is heated sufficiently, the heating element can be switched off, because a spontaneous evaporation then occurs on the oxidation catalytic converter in any case. In such a design, it is advantageous to actuate the heating element in such a manner that its output is variable, including, in particular, independently of the exhaust gas mass flow flowing through the secondary system. Injecting the hydrocarbons downstream of the engine not only has a higher degree of efficiency, in comparison to feeding hydrocarbons using engine-internal measures, but it also prevents an oil dilution by hydrocarbons.

For implementing the above-described method, it is advantageous to feed at least some of the exhaust gas flow discharged by the internal combustion engine through the secondary system for the purpose of heating said flow, prior to the start of operation of the first oxidation catalytic converter. It is also advantageous to flow exhaust gas discharged by the internal combustion engine through the secondary system after the end of an operating phase of the oxidation catalytic converter contained in the secondary system for the purpose of rinsing. The purpose of this is, on the one hand, to cool the oxidation catalytic converter by means of the relatively cool exhaust gas, compared to its temperature, flowing through said oxidation catalytic converter which thus does not overheat. In addition, under some circumstances, any hydrocarbons still contained within the secondary system are removed from it. The above described secondary rinsing is preferably carried out immediately following a catalytic operation of the first oxidation catalytic converter. The oxidation catalytic converter is then still sufficiently warm so that hydrocarbons contained in the secondary system react on said converter and therefore do not exit as hydrocarbons. In this manner a possible hydrocarbon slip is thus prevented.

Additional advantages and embodiments of invention result from the following description of an implementation example in reference to the appended figures.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Figure 1:
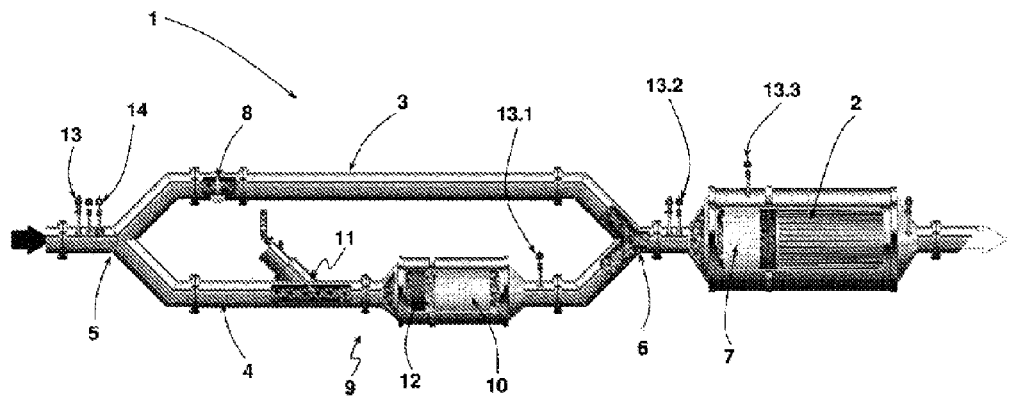
FIG. 1 is a diagrammatic representation of an exhaust emission control unit.

An exhaust emission control unit 1 is connected downstream of a diesel engine of a vehicle. The diesel engine itself is not represented in FIG. 1.

As exhaust emission control unit, the gas emission control installation 1 comprises a particle filter 2, among other parts. Upstream of the particle filter 2, the exhaust gas system of the exhaust emission control installation 1 is divided into a main system 3 and a secondary system 4. The main system 3 is part of the exhaust gas system proper, while the secondary system 4 is designed as a bypass. In the depicted example, the cross-sectional area allowing free flow is the same in the main system 3 and in the secondary system 4. It is equally possible to use designs in which the cross-sectional area allowing free flow in the secondary system 4 is either smaller than or greater than in the main system 3. The exhaust gas system splits at the position marked with the reference numeral 5 into the main system 3 and the secondary system 4. At position 6, the secondary system 4 discharges again into the main system 3. The particle filter 2 is arranged downstream of position 6. An oxidation catalytic converter 7 is connected immediately upstream of said particle filter.

For the purpose of the regulation of the exhaust gas mass flow which is to flow through the secondary system 4, an exhaust flap 8 connected in the main system 3 is used in the depicted embodiment. A catalytic burner 9 is connected in the secondary system 4. The catalytic burner 9 comprises an oxidation catalytic converter 10 and an HC port 11 which is connected upstream of said converter in the flow direction of the exhaust gas, for the purpose of metering hydrocarbons into the secondary system 4. In the represented embodiment example, an electrical heating element 12 is connected upstream of the oxidation catalytic converter 10 in the housing of said converter. For the sake of simplicity, the electrical connection of the heating element 12 is not represented, and similarly the connection of the HC port 11 to the diesel fuel supply of the engine is not shown.

The exhaust emission control installation 1 of the represented embodiment example has four temperature sensors 13, 13.1, 13.2, 13.3. The temperature sensor 13 is arranged before the bifurcation 5. The temperature sensor 13.1 is used to determine the outlet temperature of the oxidation catalytic converter 10. The temperature sensor 13.2 is arranged on the inlet side with respect to the oxidation catalytic converter 7, and the temperature sensor 13.3 is arranged on the outlet side with respect to said converter. In part, the temperature sensors can also be replaced by the use of temperature models, for example, the temperature sensors 13 and/or 13.2.

In the flow direction of the exhaust gas discharged by the diesel engine, it is possible to regulate the exhaust gas mass flow flowing through the secondary system 4 by actuating the exhaust gas flap 8. A flow which is to be led over the first oxidation catalytic converter 10 which is closest to the diesel engine. The exhaust gas which is heated during operation of the catalytic burner 9 is mixed with the exhaust gas flowing through the main system 3, after the merging of the two systems 3, 4 before the oxidation catalytic converter 7, so that the exhaust gas flow flowing to the oxidation catalytic converter 7 has a mixture temperature corresponding to the respective portions of the partial exhaust gas flows. The catalytic burner 10 is used to heat the oxidation catalytic converter 7, to bring the latter to its light-off temperature or a higher temperature.

The oxidation catalytic converter 10 arranged in the secondary system 4 downstream of the diesel engine has a considerably smaller installation size in comparison to the second oxidation catalytic converter 7. In addition, the catalytic load of the two oxidation catalytic converters 7, 10 is different. The oxidation catalytic converter 10 has a higher noble metal load, for example, when using platinum as oxidation catalytic converter 7. Therefore, the light-off temperature of the oxidation catalytic converter 10 is lower than that of the second oxidation catalytic converter 7 connected downstream of the former. In the case of the depicted embodiment, the load of the oxidation catalytic converter 10 is set so that said catalyst has a light-off temperature of approximately 200° C. The load of the oxidation catalytic converter 7 is lower. Its light-off temperature, in the depicted embodiment e, is approximately 250° C. If desired, this temperature can also be higher.

The oxidation catalytic converter 7 receives the hydrocarbons it requires for heating the exhaust gas flow via the HC port 11, and, in particular, by metering an HC quantity which is greater than the quantity that can be converted by the oxidation catalytic converter 10. The hydrocarbons that are not converted on the oxidation catalytic converter 10 are then converted on the oxidation catalytic converter 7 with the desired exothermic effect.

The sensors and actuators of the exhaust emission control installation 1 are connected to a control unit which is not represented in further detail. By means of this control unit, the sensors, here particularly the temperature sensors 13, 13.1, 13.2, 13.3, can be read, and the actuators, here the HC port 11, the heating element 12, and the exhaust gas flap 8 are actuated as well. The control unit has access to a pilot control, in which the settings of the above-mentioned actuators of the exhaust emission control installation 1 are stored, as a function of the exhaust gas mass flow discharged by the diesel engine, of the oxygen content contained therein, and of its temperature relative to a SET temperature at which the regeneration of the particle filter 2 takes place.

As a result of the above-described implementation of the exhaust emission control installation 1, a two-step catalytic burner is formed for heating the particle filter 2 to a regeneration temperature, by means of which even cool exhaust gas can be heated in a short time, including during dynamic operation of the diesel engine, to the desired temperature in order to trigger the regeneration process. Here, the catalytic burner contained in the secondary system 4, together with the parallel main system 3 with the exhaust gas flap 8 connected therein, forms a heating module. A heating of the discharged exhaust gas, for the purpose of regenerating the particle filter, occurs with the following process steps:

If a regeneration of the particle filter 2 is to be carried out at low exhaust gas temperatures, that is at temperatures at which the soot oxidation does not occur spontaneously, the actuators 8, 11, 12 of the exhaust emission control installation 1 are set for the purpose of feeding additional heat into the exhaust gas flow as a function of the currently discharged exhaust gas mass flow and its temperature. Taking such a pilot control variable makes it possible, within a short time, to achieve that the exhaust gas temperature on the upstream side with respect to the particle filter 2 reaches the SET temperature. In the represented embodiment example, the exhaust emission control installation 1 also comprises a lambda probe 14, by means of which the oxygen content contained in the exhaust gas flow can be determined. The latter content as well is stored in the pilot control diagram as a condition for the pilot control variable to be taken.

By means of the pilot control variable taken from the pilot control diagram, the actuators 8, 11 and 12 are then set. In the depicted embodiment, the heating element 12 which is connected upstream of the oxidation catalytic converter 10 is used not only for preheating the exhaust gas flow flowing to the oxidation catalytic converter 10, in order to bring the latter to or above its light-off temperature, but also in order to evaporate the HC quantity metered via the HC port 11. Therefore, on the outlet side with respect to the heating element 12, the exhaust gas mass flow is enriched with hydrocarbons contained therein in the gas phase. In order to have a particularly suitable equal distribution of the hydrocarbons within the exhaust gas flow as it flows to the oxidation catalytic converter 10, it is provided, in an embodiment example not shown in the figures, to expose the heating element 12 centrally to the introduced hydrocarbons. The heating element 12 in addition has the advantage that the HC port 11 can be arranged almost immediately before the heating element 12.

As a result, the exhaust emission control installation 1 can be designed to have a very compact construction. The entire exhaust gas mass flow flows through the secondary system 4 or through only a portion thereof, in accordance with the setting depending on the position of the exhaust gas flap 8.

In the depicted embodiment, the exhaust gas mass flow currently discharged by the diesel engine is determined by the data made available by the motor management, here: the load and the rpm.

By heating the exhaust gas mass flow flowing through the secondary system 4, the second oxidation catalytic converter 7 is heated and brought to a temperature above its light-off temperature. This heating is controlled via the temperature sensors 13.2 or 13.3. Once the oxidation catalytic converter 7 reaches its light-off temperature, the HC metering is increased, in order to feed the hydrocarbons required for the desired exothermic reaction to the oxidation catalytic converter 7 by overspraying the oxidation catalytic converter 10. The temperature of the exhaust gas flow on the outlet side with respect to the oxidation catalytic converter 7 and thus on the upstream side with respect to the particle filter 2 is determined by the temperature sensor 13.3. It is determined whether the setting that has been made has led to the desired temperature rise by means of an ACTUAL-SET temperature comparison. If there is a discrepancy between the ACTUAL temperature and the SET temperature, the setting with regard to the HC metering and/or the exhaust gas mass flow flowing through the secondary system 4 is changed by an appropriate setting of the exhaust gas flap 8. As a result of this temperature monitoring on the outlet side with respect to the oxidation catalytic converter 7, not only the pilot control variable stored in the pilot control diagram is controlled, but, as a result, changes in the operation of the diesel engine above all are also detected almost immediately, and compensated for at least to the extent possible, due to a corresponding change in the setting of the HC metering or of the exhaust gas mass flow led through the secondary system 4 for the purpose of maintaining the SET temperature. If desired, the changed setting can in addition be stored as a new or optionally additional pilot control variable in the pilot control diagram, and it is then available for future regeneration processes.

If the exhaust gas flow flowing to the particle filter 2 is at a temperature above the soot oxidation temperature, that is approximately 600-610° C., the desired regeneration process starts. In the represented embodiment example, the above-described temperature monitoring is not only used in order to trigger the regeneration process, but also to ensure that, for the duration of the regeneration process, an exhaust gas having at least the required soot oxidation temperature flows to the particle filter 2. Here, it can be provided that the regeneration duration is determined or estimated by a prior determination of the soot quantity accumulated on the filter surface. For this duration, the above-described temperature monitoring is carried out if needed, with appropriate adaptation of the respective actuators of the exhaust emission control installation 1. After the completion of the regeneration process, the exhaust gas flap 8 is brought into a position so that the exhaust gas flow flows primarily via the main system 3.

Figure 2:
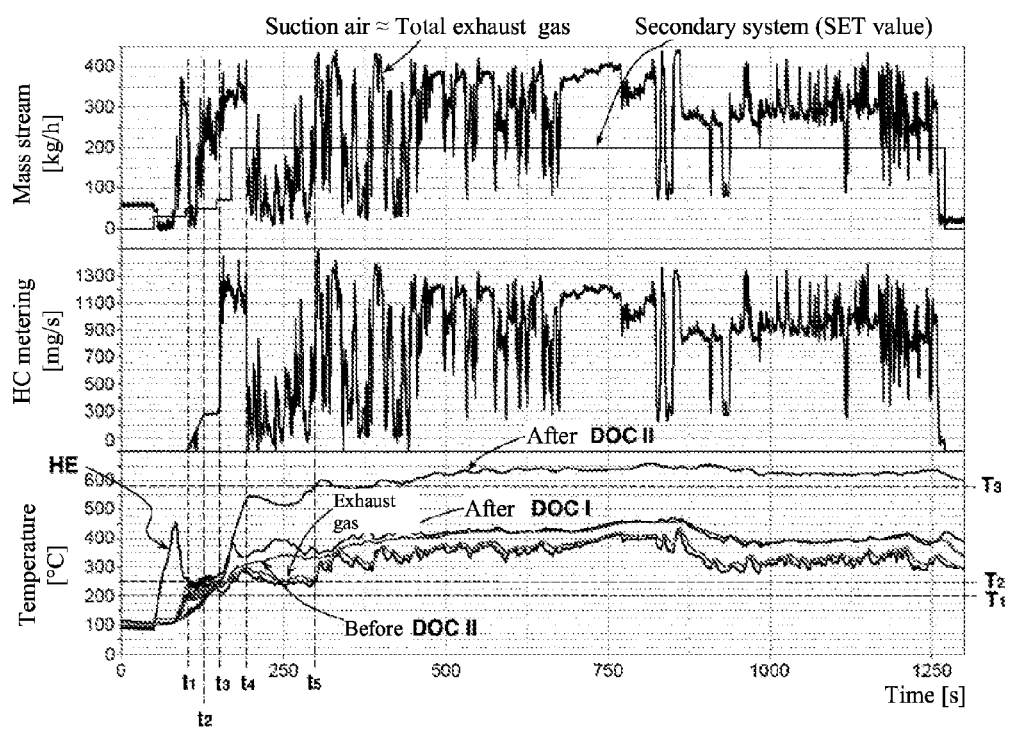
FIG. 2 shows diagrams for representing the temperature behavior at different locations within the exhaust emission control unit when running an NRTC test.

FIG. 2 shows a regeneration protocol of a test performance, in which the diesel engine is operated on the basis of the Non Road Transient Cycle (NRTC). This is a dynamic test. In the top diagram of FIG. 2, the total exhaust gas mass flow is plotted. The dynamic operation of the diesel engine becomes apparent in the related visible fluctuations. Also plotted in the uppermost diagram is the set value of the exhaust gas mass flow led through the secondary system 4. The middle diagram shows the HC quantity fed through the HC port 11. The temperature curves are plotted in the bottom diagram.

In this test, the exhaust gas temperature discharged by the diesel engine at the beginning of the test ("exhaust gas" curve) is approximately 100° C. A particle filter regeneration is to be produced at this exhaust gas temperature. In a first step, the oxidation catalytic converter 10 arranged in the secondary system 4 is brought to its light-off temperature or to a higher temperature. For this purpose, a partial exhaust gas flow is led through the secondary system 4 and the heating element 12 is exposed to said flow. The temperature curve of the heating element 12 is shown in the lower diagram and marked HE. The heating element 12 in this test was switched off at time $t_1$, after the oxidation catalytic converter 10 had been heated clearly to above its light-off temperature of approximately 200° C. Then, via the HC port 11, hydrocarbons are metered into the exhaust gas flow flowing through the secondary system 4. The catalytic conversion of the supplied hydrocarbons becomes apparent in the clear temperature increase at $t_2$ (approximately 120 s) in the temperature curve "after DOC I." Once the oxidation catalytic converter 7 has reached its light-off temperature, the HC metering is increased at time $t_3$, in order to supply, to this oxidation catalytic converter 7 as well, hydrocarbons for triggering the desired conversion. These hydrocarbons supplied via the HC port 11 are not converted on the oxidation catalytic converter 10, and they are applied to the oxidation catalytic converter 7 in the gas phase. The application of hydrocarbons to the oxidation catalytic converter 7 can be detected in the rapid increase of the temperature curve "after DOC II" shortly after time $t_3$.

If the temperature rise produced by the pilot control variable taken from the pilot control diagram, for the purpose of actuating the actuators of the exhaust emission control installation 1, is not yet sufficient on the outlet side with respect to the oxidation catalytic converter 7 (curve "after DOC II") in order to reach the SET temperature of approximately 600° C., then the settings of the actuators of the exhaust emission control installation are changed, which can be seen in a further increase of the temperature curve "after DOC II."

A comparison of the temperature curves "after DOC I" and "before DOC II" recorded in the bottom diagram in FIG. 2 clearly shows the uniform distribution of the temperature of the exhaust gas flowing to the second oxidation catalytic converter 7 achieved by the mixing of the partial exhaust gas flow led from the secondary system 4 with the one led through the main system 3. In addition, the temperature rise achieved by operating the oxidation catalytic converter 7 (DOC II) becomes clear, as shown in the curve "after DOC II." Thus, by this method it is possible, regardless of whether a regeneration process is carried out or not, to monitor the temperature of the second oxidation catalytic converter and of the particle filter 2, in particular for the purpose of avoiding a rapid temperature change. As a result, the useful life of the oxidation catalytic converter and of the particle filter, particularly if they are made from a ceramic substrate, is increased considerably.

For orientation, in this temperature diagram, the light-off temperature of the oxidation catalytic converter 10 is recorded as $T_1$, and that of the oxidation catalytic converter 7 as $T_2$. $T_3$ is the temperature at which a soot oxidation starts to occur.

Figure 3:
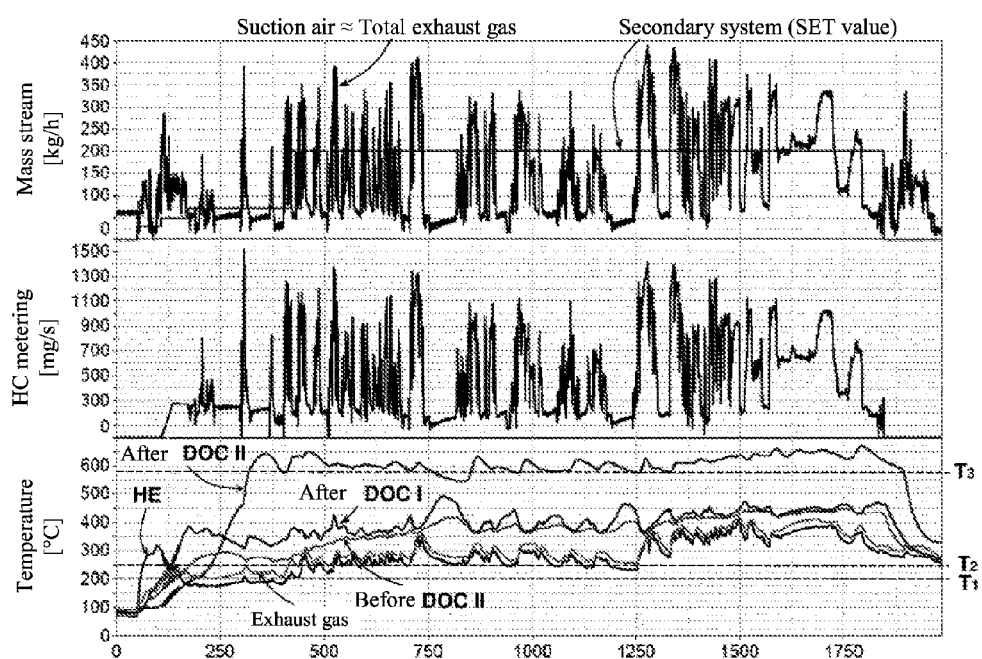
FIG. 3 shows diagrams for representing the temperature behavior at different locations within the exhaust emission control unit when running a WHTC test.

FIG. 3 shows an additional test implementation which corresponds in principle to that of FIG. 2. The test setup of FIG. 3 differs from that of FIG. 2 in that another cycle was run. The cycle according to FIG. 3 was run based on the World Harmonized Transient Cycle (WHTC).

The two test performances illustrate clearly that, in spite of large fluctuations during the dynamic operation of the diesel engine, on the outlet side with respect to the second oxidation catalytic converter 7 (curve "after DOC II") an exhaust gas temperature can be observed which is subject to only slight fluctuations. This clearly shows that, using the above-described method, it is possible not only to react with shorter reaction time to dynamic fluctuations, but also that, even in the case of such fluctuations and in the case of very low exhaust gas temperature, a regeneration process of the particle filter 2 can take place as intended.

Figure 4:
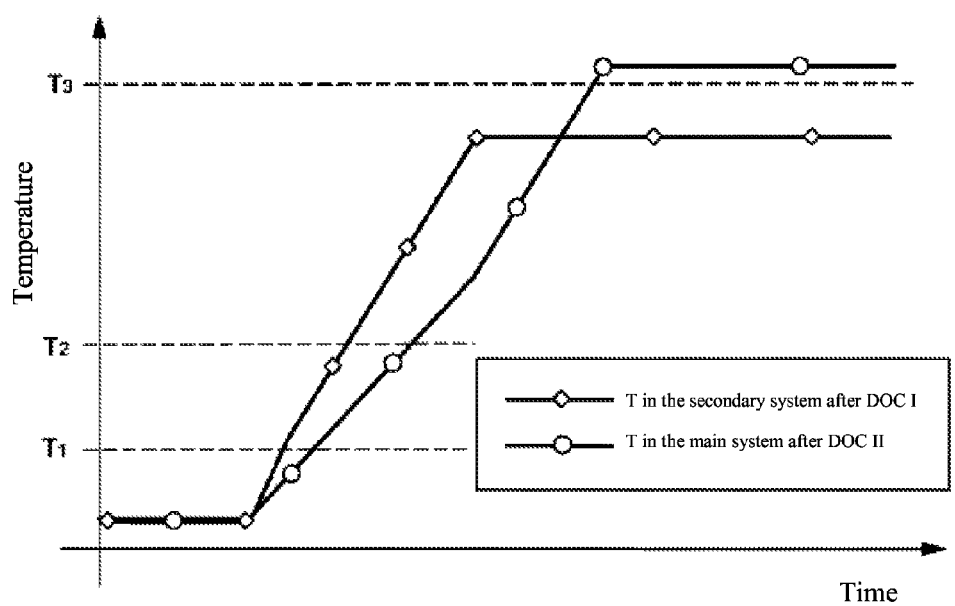
FIG. 4 is a diagrammatic representation summarizing the results of the tests, represented in FIGS. 2 and 3.

In FIG. 4, the heating of the exhaust gas flow to induce a soot oxidation on the particle filter 2 for its regeneration is shown diagrammatically as a summary of the results of the investigations according to FIGS. 2 and 3. The temperature data $T_1$, $T_2$, $T_3$ correspond to those of FIGS. 2 and 3. FIG. 4 shows clearly that, owing to the use of the heating element 12, the smaller construction size, and of the higher noble metal load of the oxidation catalytic converter 10 (DOC I) arranged in the secondary system 4, the latter converter is heated more rapidly than the oxidation catalytic converter 7 arranged in the main system 3 (DOC II).

The above described actuation and regulation process is overlain by a control or observation of the temperature of the oxidation catalytic converter 10 connected in the secondary system 4, so that the latter converter is not heated above its allowable maximum temperature. If said converter is about to become excessively hot, either the HC metering is reduced and/or the exhaust gas mass flow led through the secondary system 4 is increased.

The heating element 12 connected in the secondary system 4 can then be used in order to verify the operational reliability of the exhaust gas flap 8. This occurs under an operation condition of the diesel engine that should remain as unchanged as possible for the duration of the measurement. Using as basis the exhaust gas mass discharged by the diesel engine, and following the addition of a certain energy quantity for heating the heating element 12, a certain temperature rise is expected. If the temperature rise observed differs significantly from the expected one, this is a sign that the exhaust gas flap 8 is not in the correct position, and therefore the required exhaust gas flow has not passed through the secondary system 4.

In the exhaust emission control installation described, CO is also oxidized at the oxidation catalytic converter 7 located in the main system, and as a result the CO discharge is decreased. Consequently, it is understood that, as exhaust emission control unit whose operating temperature is to be monitored, one can also use only an oxidation catalytic converter without a particle filter connected downstream of said converter.

It is possible, if the exhaust gas discharged by the internal combustion engine is at a sufficient temperature, to lead the exhaust gas flow in its entirety or partially through the secondary system for a certain duration to bring the oxidation catalytic converter connected in the secondary system to its operating temperature. This serves the purpose of preheating the oxidation catalytic converter arranged in the secondary system to the extent possible by means of the heat of the exhaust gas, in order to bring said converter to its operating temperature. In the case of this measure, the entire exhaust gas flow can be led through the secondary system. Typically, such a measure is undertaken upstream of a provided regeneration of the particle filter. It is understood that, in addition, the heating element connected in the secondary system can also be used for the purpose of preheating the oxidation catalytic converter.

In addition, the above described method can contain diagnostic functions which can be used individually or in combination with each other. In this context, a preliminary verification can take place before carrying out the method to determine whether the method can be implemented at all. This comprises a functionality verification of the components participating in carrying out the method for the presence of any errors. Typically, this also includes the determination of the temperature at the oxidation catalytic converter contained in the secondary system. For example, if a determination is made that its temperature is still below its light-off temperature, an error message can be generated and/or an injection of hydrocarbons can be delayed until said catalytic converter has again reached its light-off temperature. The same applies accordingly to the operation of the second oxidation catalytic converter, in particular to the effect that an overspraying of the first oxidation catalytic converter is allowed only if the second catalytic converter has reached a temperature equal to or above its light-off temperature.

Additional diagnostic functionalities can be used in regard to the conversion rates of the two oxidation catalytic converters. A functionality verification of the oxidation catalytic converters can be conducted, for example, by introducing a predefined hydrocarbon quantity into the exhaust gas mass flow flowing to the oxidation catalytic converter, and by comparing the temperature rise which can be calculated from said quantity, if the exhaust gas mass flow is known, with the actually achieved temperature rise. In this manner, unexpected aging phenomena on the oxidation catalytic converters can be detected. A system- and material-caused aging of the oxidation catalytic converters, on the other hand, will be taken into consideration in the diagnosis.

Yet another diagnostic functionality can be implemented for verifying the setting element by means of which the exhaust gas flow flowing through the secondary system can be regulated. Besides the method that has already been described above, this setting element can also be implemented, without having to admix hydrocarbons to the exhaust gas mass flow. This succeeds by exploiting the circumstance that the main system and the secondary system have different heat losses. Since these variables are known, it is possible, to verify their functionality by comparing the exhaust gas temperatures measured at the temperature sensor 13 and at the temperature sensor 13.2, and the heat loss determined therefrom for a predetermined setting of the control element, for example, of the exhaust gas flap 8. In the case of a closed exhaust gas flap, the entire exhaust gas mass flow flows through the secondary system, so that, at the temperature sensor 13.2, if the exhaust gas mass flow is known, a temperature could then be measured which corresponds, following deduction of the heat loss of the secondary system, to the temperature measured at the temperature sensor 13. The same applies in the other end position of the exhaust gas flap, namely when the latter is open and the entire exhaust gas mass flow flows through the main system.

The thermal energy feed method is advantageously carried out in such a manner that an HC slip is kept as small as possible, or even prevented entirely. The above-described diagnostic methods help achieve this goal. In addition, if an increase in the HC quantity to be fed becomes necessary, it is possible to design this as a ramp-like increase, and not to increase the HC metering quantity abruptly.

The invention is described in reference to an embodiment example in which the light-off temperature of the oxidation catalytic converter in the secondary system is lower, as a result of a higher noble metal load, than that of the oxidation catalytic converter arranged in the main system and downstream of the above-mentioned oxidation catalytic converter. In principle, this is not necessary. Rather, the oxidation catalytic converter arranged in the secondary system can also have a light-off temperature corresponding to that of the converter arranged in the main system or another light-off temperature, if the oxidation catalytic converter arranged in the secondary system can be brought by other means, for example, by an appropriately designed heating device, more rapidly to its light-off temperature than the other oxidation catalytic converter connected downstream of the former.

The description of the invention clearly shows that, by means of the described method, it is not only possible to bring an exhaust emission control unit connected in the exhaust gas system of an internal combustion engine, for example, a particle filter, to a SET temperature, but, using this method, it is also possible to achieve a uniform distribution of the temperature management of the exhaust emission control unit.

The description of the invention has been explained in reference to embodiment examples. Without leaving the scope of the valid claims, for a person skilled in the art, additional embodiments result which are capable of embodying the invention, without the need to describe them in detail. Similarly, these embodiments are also part of the disclosure content of these explanations.

LIST OF REFERENCE NUMERALS

1 Exhaust emission control installation
2 Particle filter
3 Main system
4 Secondary system
5 Position
6 Position
7 Oxidation catalytic converter
8 Exhaust gas flap
9 Catalytic burner
10 Oxidation catalytic converter
11 HC port
12 Heating element
13, 13.1, 13.2, 13.3 Temperature sensor
14 Lambda probe

The invention claimed is:

1. A method for feeding thermal energy into an exhaust emission control unit connected in an exhaust gas system of an internal combustion engine comprising the steps of:
   heating an exhaust gas discharged from the internal combustion engine flowing to the exhaust emission control unit to a SET temperature by converting hydrocarbons (HCs) metered into the exhaust gas flow at two oxidation catalytic converters series-connected in the flow direction of the exhaust gas,
   the exhaust gas system splitting into a main and a secondary system, allowing the exhaust gas to be split into two streams;
   of which the first oxidation catalytic converter which is closer to the internal combustion engine in the flow direction of the exhaust gas is arranged in the secondary system and the second oxidation catalytic system connected downstream of the former in the exhaust gas system is arranged after the merging of the main and secondary systems;
   setting an HC metering for feeding hydrocarbons to the secondary system upstream of the first oxidation catalytic converter and/or an exhaust gas mass flow flowing through the secondary system as a function of a mass of the total exhaust gas flow discharged from the internal combustion engine, of an ACTUAL temperature and of the SET temperature of the exhaust gas flowing to the exhaust emission control unit, and by means of a pilot control variable which corresponds to or approach the current conditions, and which is taken from a pilot control diagram that takes into consideration the exhaust gas flow and the temperature rise to be achieved, repeatedly determining the ACTUAL temperature of the exhaust gas flowing to the exhaust emission control unit is, and if a difference between the ACTUAL temperature and the SET temperature is noted, the setting of the HC metering and/or of the exhaust gas mass flow flowing through the secondary system is modified to reach the SET temperature, wherein temperature monitoring steps are repeated as often as needed until the SET temperature is reached.

2. The method of claim 1 further comprising in that the repeated steps of temperature monitoring are repeated continuously until a certain process of the exhaust emission control unit is completed or said process is to be terminated.

3. The method of claim 1 wherein the exhaust gas flow flowing to the first oxidation catalytic converter is heated electro-thermally to a temperature which is equal to or greater than the light-off temperature of the first oxidation catalytic converter before said flow reaches the first oxidation catalytic converter.

4. The method of claim 1 wherein before the startup and/or after the completion of an operating phase of the first oxidation catalytic converter, the exhaust gas flow discharged from the internal combustion engine is led at least partially through the secondary system.

5. The method of claim 1, wherein the exhaust gas mass flow discharged by the internal combustion engine is led in its entirety through the secondary system, in that the latter flow within the secondary system is heated by means of a defined energy quantity, subsequently the temperature rise achieved by the heating is measured, and subsequently, as a function of the energy quantity used and the achieved temperature rise, the exhaust gas mass flow discharged by the internal combustion engine is determined.

6. The method of claim 1 further comprising the steps of feeding a portion of the exhaust gas mass flow discharged by the internal combustion engine through the secondary system and heating said flow within the secondary system by means of a defined energy quantity, subsequently the temperature rise achieved by the heating is measured, and subsequently, as a function of the energy quantity used and the achieved temperature rise, the partial exhaust gas mass flow and thus also the exhaust gas mass flow discharged by the internal combustion engine are determined.

7. The method of claim 5 wherein the exhaust gas mass flow led through the secondary system is heated electrothermally.

8. The method of claim 1 further comprising changing the settings of the HC metering and/or optionally of the exhaust gas mass flowing through the secondary system when the second oxidation catalytic converter has reached its light-off temperature, to the effect that the HC metering is increased for the purpose of feeding hydrocarbons to the second oxidation catalytic converter.

9. The method of claim 8 wherein the light-off temperature of the first oxidation catalytic converter is lower than that of the second oxidation catalytic converter.

10. The method of claim 8, wherein the settings of the HC metering and of the exhaust gas mass flow flowing through the secondary system are set such that the hydrocarbons to be fed to the second oxidation catalytic converter reach said converter in the gas phase.

11. The method of claim 1, further comprising the steps of monitoring the ACTUAL temperature of the first oxidation catalytic converter to determine whether it has reached a predetermined maximum temperature, and in that, when it is detected that the maximum temperature has been reached, either increasing the exhaust gas mass flow flowing through the secondary system and/or reducing the HC metering.

12. The method of claim 1 wherein at the time of the setting of the HC metering and of the exhaust gas mass flow flowing through the secondary system, the oxygen contained in the exhaust gas is taken into consideration.

13. The method of claim 1, further comprising the step of changing the cross-sectional area allowing free flow in at least one of the two systems for controlling the exhaust gas mass flow flowing through the secondary system.

14. The method of claims 1, wherein the setting with regard to the HC metering and the exhaust gas mass flow flowing through the secondary system at which the SET temperature of the exhaust gas flowing to the exhaust emission control unit has been reached, is stored as new pilot control variable with respect to the outlet ACTUAL temperature and the outlet exhaust gas mass flow in the pilot control diagram.

15. The method of claim 1, wherein the method for triggering the regeneration process of a particle filter is carried out and the regeneration process is carried out.

* * * * *